(12) United States Patent
Deng

(10) Patent No.: US 7,784,428 B2
(45) Date of Patent: Aug. 31, 2010

(54) MAGNETIC SCRUBBER ASSEMBLY AND DESIGN METHOD

(75) Inventor: Peixing Deng, Shenzhen (CN)

(73) Assignee: Shenzhen Xing Risheng Industrial Co., Ltd., Shenzhen (CN)

( * ) Notice: Subject to any disclaimer, the term of this patent is extended or adjusted under 35 U.S.C. 154(b) by 353 days.

(21) Appl. No.: 11/983,011

(22) Filed: Nov. 5, 2007

(65) Prior Publication Data

US 2008/0105211 A1 May 8, 2008

(30) Foreign Application Priority Data

Nov. 6, 2006 (CN) .......................... 2006 1 0063524

(51) Int. Cl.
*A01K 63/00* (2006.01)
*A47L 1/12* (2006.01)

(52) U.S. Cl. ...................................... 119/264; 15/220.2

(58) Field of Classification Search .................. 119/264, 119/245; 15/103, 22.2, 28, 220.2
See application file for complete search history.

(56) References Cited

U.S. PATENT DOCUMENTS

| | | | | |
|---|---|---|---|---|
| 5,988,109 A | * | 11/1999 | Rofen | 119/245 |
| 6,634,052 B2 | * | 10/2003 | Hanson | 15/220.2 |
| 6,865,771 B2 | * | 3/2005 | Hanson | 15/220.2 |
| 6,988,290 B2 | * | 1/2006 | Enoch et al. | 15/103 |
| 7,232,519 B2 | * | 6/2007 | Bluteau | 210/167.21 |
| 7,313,840 B2 | * | 1/2008 | Watkins | 15/103 |
| 2004/0018104 A1 | * | 1/2004 | Watkins | 417/423.3 |

FOREIGN PATENT DOCUMENTS

JP 09271455 A * 10/1997

* cited by examiner

*Primary Examiner*—Yvonne R. Abbott
(74) *Attorney, Agent, or Firm*—Westman, Champlin & Kelly, P.a.

(57) ABSTRACT

A magnetic scrubber assembly and its design method for cleaning the wall-glass of an aquarium are provided. The center of gravity of the internal scrubbing component is designed underneath its the geometrically horizontal central axes. A product of length Lp from a center of gravity Pp of an internal scrubbing component to a lowest part and the center of gravity P of the internal scrubbing component is smaller than a product of a length Lf from equivalent function point Pf of buoyancy F such that the internal scrubbing component is received to its lowest part. This ensures that the internal scrubbing component can erect automatically after it is lied down. When the internal scrubbing component breaks away from the control of a hand-held scrubbing component, the internal scrubbing component can sink upright, and the magnetic scrubber assembly is restored to the normal operation condition.

10 Claims, 5 Drawing Sheets

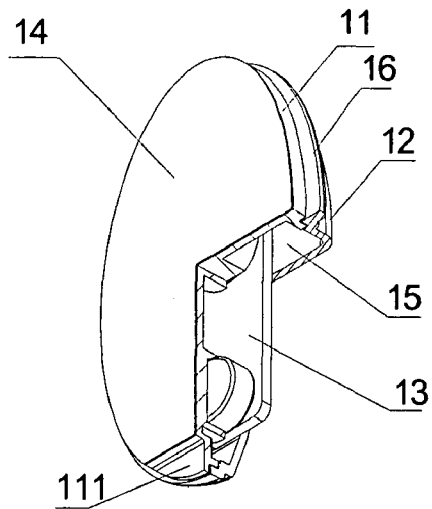 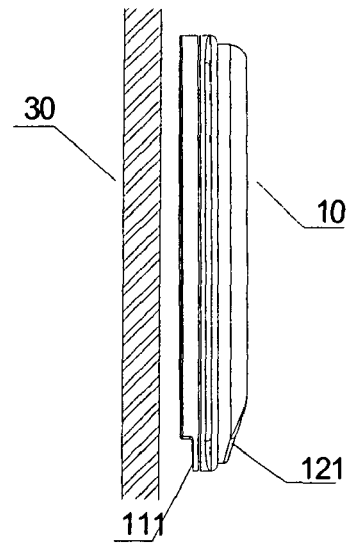
FIG. 1-3              FIG. 1-4
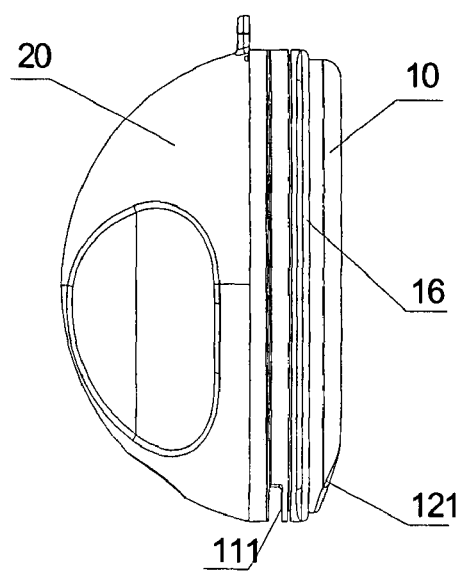
FIG. 1-5
FIG. 1

MAGNETIC SCRUBBER ASSEMBLY AND DESIGN METHOD

THE FIELD OF THE INVENTION

This invention relates to the special methods or apparatus for cleaning hollow articles, particularly, to the apparatus for cleaning an aquarium designed to sustain aquatic life, and more particularly, to the scrubbing tools used for cleaning the wall-glass of the aquarium.

BACKGROUND OF THE INVENTION

The present application claims priority of Chinese patent application Serial No. CN 200610063524.0, filed Nov. 6, 2006, the content of which is hereby incorporated by reference in its entirety.

The prior art scrubbing tools used for cleaning the wall-glass of the aquarium are commonly magnetic scrubber assembly. The said magnetic scrubber assembly comprises an internal scrubbing component and an external hand-hold scrubbing component within both of which magnets are installed, the mutually attracted surfaces of the two scrubbing components are covered with scrubbing material for cleaning the wall-glass of the aquarium. The external hand-hold scrubbing component slides on the outer surface of the wall-glass of the aquarium and synchronously draws the internal scrubbing component to move on the inner surface of the same wall-glass, and therefore using the magnetic scrubber assembly both the surfaces of the wall-glass of the aquarium can be cleaned at the same time. However, there is a problem in the usage of the prior art magnetic scrubber assembly: if the internal scrubbing component is disengaged from the magnetic force control of the external hand-hold scrubbing component, it is troublesome to restore the magnetic scrubber assembly as a whole to the normal operation condition, i.e. to rightly reposition the magnetic scrubber assembly to make the external scrubbing component control the internal scrubbing component with the magnetic force again. The commonly applied solutions at present are as follows:

1. The internal scrubbing component will sink to the bottom of the aquarium after it is disengaged from the magnetic force control of the external hand-hold scrubbing component, but it can be fished out by the hand or tools put into water so as to restore the magnetic scrubber assembly to the normal operation condition.

2. The internal scrubbing component is connected with the external hand-hold scrubbing component via a string and it can be drawn out by the string after it is disengaged from the magnetic force control of the external hand-hold scrubbing component, and then the magnetic scrubber assembly can be restored to the normal operation condition.

3. To make the specific gravity of the internal scrubbing component lower than that of the liquid contained in the aquarium so as to that the internal scrubbing component can float onto the liquid surface if the said two components disengage magnetically from each other. After that to try moving the internal scrubbing component to a place adjacent to the inner surface of the wall-glass of the aquarium, and then the magnetic scrubber assembly can be restored to the normal operation condition.

The above-mentioned solutions fail to provide a convenient way to restore the magnetic scrubber assembly to normal operation condition, and are even more difficult to practice when they are applied to the aquariums that are installed on high or are embedded into the wall, or the aquariums with a top cover.

SUMMARY OF THE INVENTION

The technical problem of this invention aims to settle is that to avoid the above-mentioned disadvantages of the prior art and to provide an easier-to-use against-wall-glass sinking magnetic scrubber assembly and its design method, based on the prior-art magnetic scrubber assembly.

The said technical problem can be resolved by this invention via adopting the following technical solution:

To provide the design method of an against-wall-glass sinking scrubber assembly based on using the magnetic scrubber assembly for cleaning the wall-glass of an aquarium, comprising an internal scrubbing component and a hand-hold scrubbing component; comprising the steps of:

A. a set of magnets and magneto-conductive plate are installed in the said internal scrubbing component, another set of magnets and magneto-conductive plate are installed in the said hand-hold scrubbing component, and therefore the internal scrubbing component on the inner surface of the wall-glass can move as with the movement of the hand-hold scrubbing component on the outer surface of the wall-glass of the aquarium;

B. the scrubbing material is covered respectively on the surfaces of the front cover of the said internal scrubbing component and of the base shell of the said hand-hold scrubbing component;

C. the total specific gravity of internal scrubbing component is greater than that of the liquid contained in the aquarium;

D. the center of gravity of the internal scrubbing component is designed underneath its the geometrically horizontal central axes;

E. the product of the length Lp from the center of gravity Pp of internal scrubbing component to the lowest part and the gravity P of the internal scrubbing component is smaller than the product of the length Lf from equivalent function point Pf of buoyancy F that the internal scrubbing component is received to its lowest part and the buoyancy F that the internal scrubbing component is received, therefore, which can ensure that the internal scrubbing component can erect automatically after it lied down for whatever reasons.

The said technical problem can be resolved by this invention further via adopting the following technical solution:

Design and use an against-wall-glass sinking magnetic scrubber assembly for cleaning wall-glass of an aquarium, comprising an internal scrubbing component for cleaning inner surface of the said wall-glass and a hand-hold scrubbing component which slides on outer surface of the said wall-glass; the said internal scrubbing component comprises a front cover, a rear cover, a magnet group and a scrubbing material; the said hand-hold scrubbing component comprises a base shell, a handle, a magnet group and a scrubbing material; the hand-hold scrubbing component slides on the outer surface of the wall-glass of the aquarium and synchronously draws the internal scrubbing component to move on the inner surface of the same wall-glass; the said internal scrubbing component further comprises a hermetic cavity between the front cover and the rear cover; and the said magnet groups comprise at least a permanent magnet respectively and a sheet of magneto-conductive plate respectively, wherein the magnet group is installed within the said hermetic cavity without jamming up; an inclined plane is positioned at the lowest part below the central axis of the rear cover.

Compared with the prior art, the advantageous effects of this invention are as follows:

1. When the internal scrubbing component of against-wall-glass sinking magnetic scrubber assembly breaks away from the control of hand-hold scrubbing component, the internal scrubbing component can sink upright because the center of gravity Pp of the internal scrubbing component is designed underneath its the geometrically horizontal central axes. And because the product of length Lp from center of gravity Pp of the internal scrubbing component to the lowest part and the gravity P of the internal scrubbing component is smaller than the product of length Lf from equivalent function point Pf of the buoyancy F that the internal scrubbing component is received to its lowest part and the buoyancy F that the internal scrubbing component is received, therefore, which can ensure that the internal scrubbing component can erect automatically without being overturned or askew after it sinks and lies down for whatever reasons. At this time the magnetic scrubber assembly can be conveniently restored to the normal operation condition by simply moving the hand-hold scrubbing component to the external surface of the wall-glass corresponding to position of the internal scrubbing component. The said disadvantages of prior art can be overcome therefore.

2. If the bottom of the aquarium is covered with sand and the said internal scrubbing component sinks to the bottom against the inner surface of the wall-glass of the aquarium, because the lower part of the front cover of the internal scrubbing component is shaped as concave surface, the said magnetic scrubber assembly can be restored to the normal operation condition without carrying any sand grain between the scrubbing material of the front cover and the wall-glass of the aquarium, which would cause the scrape over the inner surface of the wall-glass.

3. The flange or an inclined plane is to be configured around the circular periphery of the said internal scrubbing component would avoid the fingers being trapped due to the vehement attractive force between the magnets while the hand-hold scrubbing component and the internal scrubbing component directly attract each other without any intervenient. Furthermore, this design can also facilitate the removing of internal scrubbing component from the wall-glass of the aquarium.

BRIEF DESCRIPTION OF DRAWINGS

FIG. 1-1 is the axonometric projection view of the said magnetic scrubber assembly being dissected.

FIG. 1-2 is the axonometric projection viewing from another angle of the said magnetic scrubber assembly being dissected.

FIG. 1-3 is the axonometric projection view of the partial-dissected part 10 of the said internal scrubber component as shown in embodiment 1.

FIG. 1-4 is the orthogonal projection view of the said internal scrubber component in service mode.

FIG. 1-5 is the orthogonal projection view when the inner scrubber component and the external component attract directly to each other.

FIG. 2 is the perspective view of the preferred embodiment 2 for the said against-wall-glass sinking magnetic scrubber assembly proposed by the present invention. It comprises:

FIG. 2-1 is the axonometric projection view of the of the said magnetic scrubber component being dissected.

FIG. 2-2 is the axonometric projection viewing from another angle of the said magnetic scrubber component being dissected.

FIG. 2-3 is the orthogonal projection view of the part 10 of the said internal scrubber component in service mode.

FIG. 2-4 is the orthogonal projection view of when the inner scrubber component 10 and the external component 20 attract directly to each other.

FIG. 3 is the analysis view of internal scrubbing component 10 under stress of liquid contained in the aquarium.

FIG. 4 is the decomposition chart of the inclined plane at the lowest part of internal scrubbing component 10 under stress of water W.

DETAILED DESCRIPTION OF THE PREFERRED EMBODIMENT

An elaborated illustration based on the preferred embodiments as shown in the attached figures is provided as follows.

Figures 1, 2:
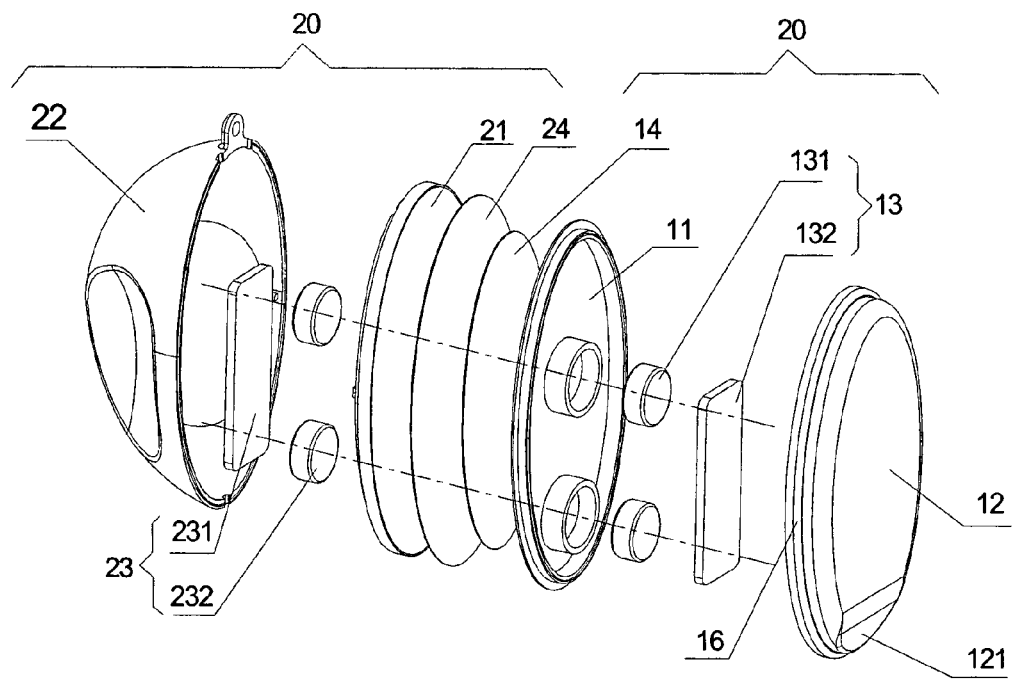
Figure 2:
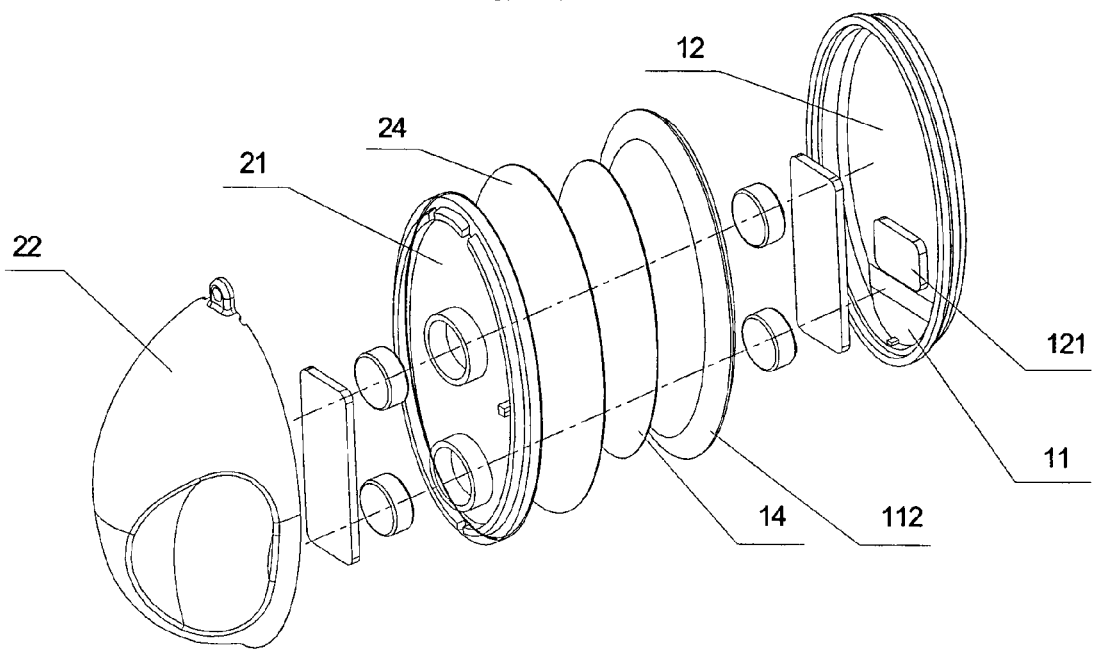
Figures 2, 3:
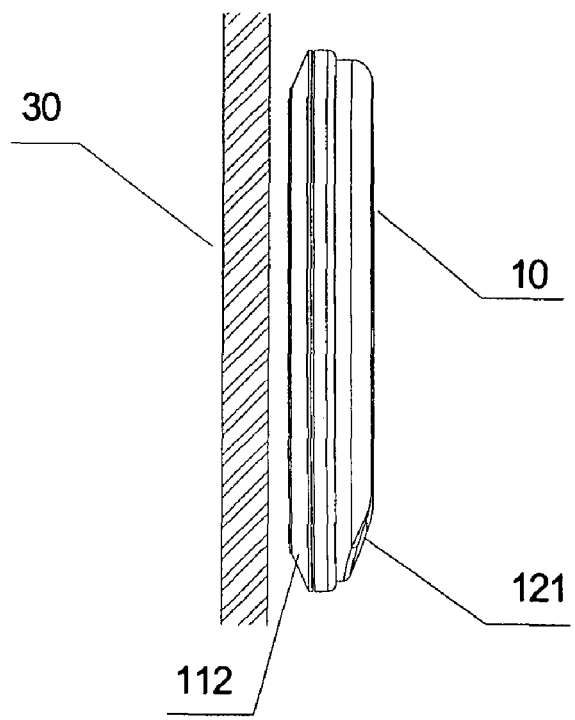

This invention relates to the design method of an against-wall-glass sinking magnetic scrubber assembly based on using the magnetic scrubber assembly for cleaning the wall-glass of an aquarium, comprising an internal scrubbing component and an hand-hold scrubbing component; characterized in that comprising the steps of:

A. a set of magnets and magneto-conductive plate are installed in the said internal scrubbing component, another set of magnets and magneto-conductive plate are installed in the said hand-hold scrubbing component, and therefore the internal scrubbing component on the inner surface of the wall-glass can move as with the movement of the hand-hold scrubbing component on the outer surface of the wall-glass of the aquarium;

B. the scrubbing material is covered respectively on the surfaces of the front cover of the said internal scrubbing component and of the base shell of the said hand-hold scrubbing component;

C. the total specific gravity of internal scrubbing component is greater than that of the liquid contained in the aquarium;

Showed as in FIG. 3,

D. the center of gravity of the internal scrubbing component is designed underneath its the geometrically horizontal central axes; and therefore ensures the internal scrubbing component can sink upright when it deviates from the magnetic force of external scrubbing component.

E. The product of length Lp from the equivalent function point Pp of the internal scrubbing component's the gravity P to the lowest part and gravity P of the internal scrubbing component is smaller than the product of length Lf from equivalent function point Pf of buoyancy F that the internal scrubbing component is received to its lowest part and the buoyancy F that the internal scrubbing component is received, therefore, which can ensure that the internal scrubbing component can erect automatically after it lied down for whatever reasons.

The front and rear covers of the said internal scrubbing component are made of material whose specific gravity is lower than that of water, or a hermetic cavity is configured between the front and the rear covers of the said internal scrubbing component to ensure the total specific gravity of internal scrubbing component is slightly greater than that of the liquid contained in the aquarium.

The lowest part below the geometrically horizontal central axes of the rear cover of the internal scrubbing component is to be shaped as an inclined plane. The internal scrubbing component 10 will sink slowly after having broken away from the control of hand-hold scrubbing component, the inclined plane 121 is to be designed at the lowest part underneath the geometrically horizontal central axes of the rear cover 12 of the internal scrubbing component is under the water stress W that is vertical to the inclined plane, showed as in FIG. 4, water stress W is decomposed into the straight-up Wv and horizontal Wh, wherein, the Wh makes the internal scrubbing component 10 sink against the wall surface of aquarium.

When the internal scrubbing component is in an upright position, the function lines of gravity P and buoyancy F that the internal scrubbing component is received are in the same vertical line. This make the internal scrubbing component sink upright after having broken away from the control of hand-hold scrubbing component.

A counterweight block is mounted underneath the geometrically horizontal central axes of the rear cover of the internal scrubbing component. The weight change of counterweight block can easily adjust that the function lines of gravity P and buoyancy F that the internal scrubbing component is received are in the same vertical line, and to ensure that the internal scrubbing component in an upright position when it sinks and sinks down the bottom of aquarium. The counterweight block can be fixed by the stickiness.

Figure 1:
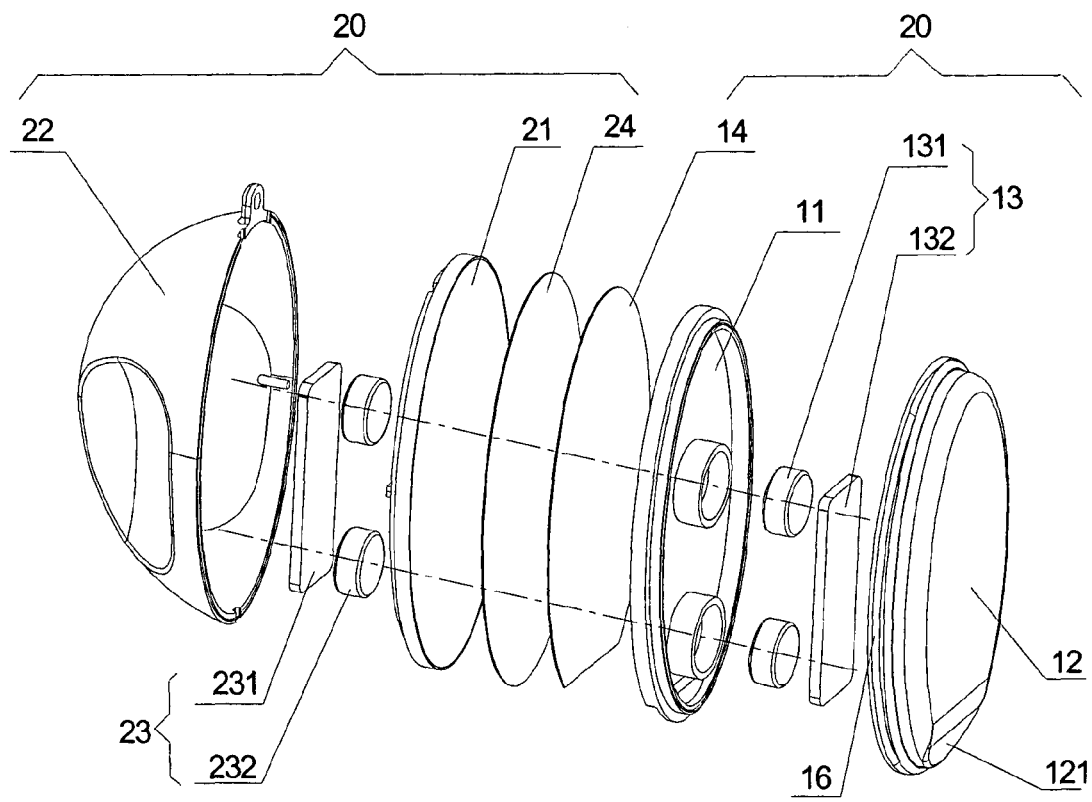
FIG. 1 is the perspective view of the preferred embodiment 1 for the said against-wall-glass sinking magnetic scrubber assembly proposed by the present invention, it comprises.
Figures 1, 2:
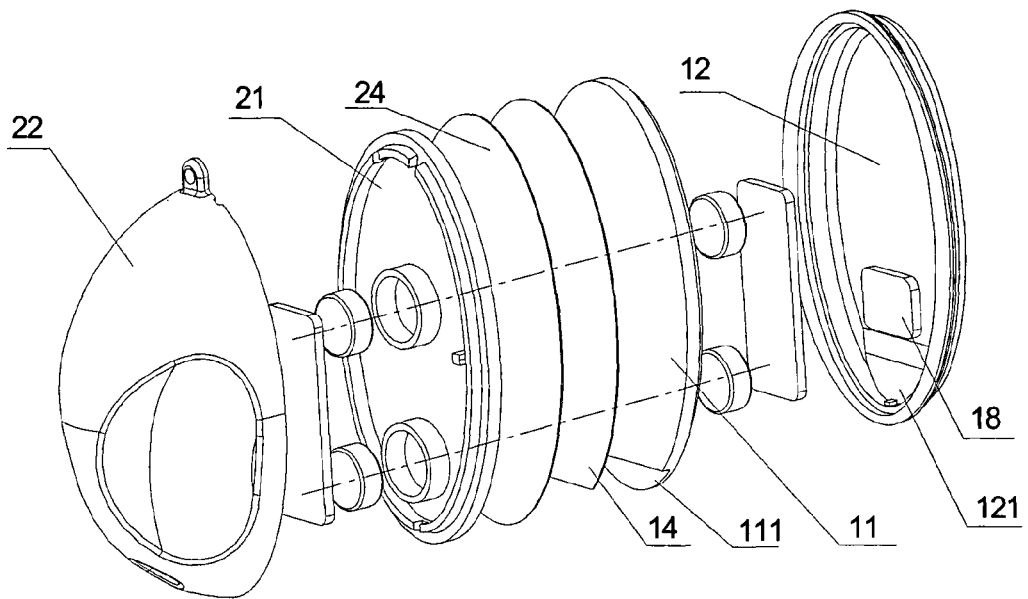

The present invent an against-wall-glass sinking magnetic scrubber assembly for cleaning wall-glass of an aquarium, Showed as in FIG. 1 and FIG. 2 comprising an internal scrubbing component 10 for cleaning inner surface of the said wall-glass and a hand-hold scrubbing component 20 which slides on outer surface of the said wall-glass; the said internal scrubbing component 10 comprises a front cover 11, a rear cover 12, a magnet group 13 and a scrubbing material 14; the said hand-hold scrubbing component 20 comprises a base shell 21, a handle 22, a magnet group 23 and a scrubbing material 24; the hand-hold scrubbing component 20 slides on the outer surface of the wall-glass of the aquarium and synchronously draws the internal scrubbing component 10 to move on the inner surface of the same wall-glass; more particularly, the said internal scrubbing component 10 further comprises a hermetic cavity 15 between the front cover 11 and the rear cover 12; and the said magnet groups 13, 23 comprise at least a permanent magnet respectively 131, 231 and a sheet of magneto-conductive plate respectively 132, 232, wherein the magnet group 13 is installed within the said hermetic cavity 15 without jamming up; the said rear cover 12 further comprises an inclined plane 121 positioned at the lowest part underneath the geometrically horizontal central axes of the rear cover 12.

The said front cover 11 further comprises a concave surface 111 positioned at the lowest part underneath the geometrically horizontal central axes of the front cover 11. The internal scrubbing component 10 further comprises a flange 16 configured around all the circular periphery of the rear cover 12 of the said internal scrubbing component 10.

The circular periphery of the front cover 11 of the said internal scrubbing component 10 is configured as an inclined plane 112 for transition.

Here two preferred embodiments are provided for the purpose of illustrating the said technical program. The said against-wall-glass sinking magnetic scrubber assemblies respectively shown in the preferred embodiment 1 and embodiment 2 assume the identical structure. As shown in FIG. 1 and FIG. 2 respectively, the said internal scrubbing component 10 includes the front cover 11, rear cover 12, the magnet group 13 and scrubbing material 14 and counterweight block 18. The said hand-hold scrubbing component 20 includes the base shell 21, the handle 22, the magnet group 23 and the scrubbing material 24. The movement of the said external hand-hold scrubbing component 20 along the aquarium observation glass accompanies the concomitant movement along the along the inner surface of the said obser-vation glass. In particular, the said internal scrubbing component 10 further includes hermetical hermetic cavity 15 enclosed by and between front cover 11 and rear cover 12. The said magnet group 13, 23 respectively include at least one permanent magnet 131, 231 and one sheet of magneto-conductive plate 132,232. The said magnet group 13 is supposed to be installed within the hermetic cavity 15 without completely filling it and the equivalent gravity is underneath the geometrically horizontal central axes.

The said rear cover further includes an inclined plane 121 being distributed at the lowest part underneath the central axes of the rear cover. By securing a hermetic cavity 15 between the said front cover 11 and the rear cover 12 of the said internal scrubbing component 10, or by fabricating the front cover 11 and the rear cover 12 of the said internal scrubbing component 10 with the material whose specific gravity is lower than that of the liquid in the aquarium, the entire specific gravity of the internal scrubbing component 10 is slightly greater than that of the liquid in the aquarium.

The counterweight block 18 is fixed by the stickiness underneath the geometrically horizontal central axes of the rear cover 12 of the internal scrubbing component. The center of gravity Pp of the internal scrubbing component is underneath its the geometrically horizontal central axes. The product of length Lp from the center of gravity Pp of the internal scrubbing component to the lowest part and gravity P of the internal scrubbing component is smaller than the product of length Lf from equivalent function point Pf of buoyancy F that the internal scrubbing component is received to its lowest part and the buoyancy F that the internal scrubbing component is received. Therefore, it can be ensured that the sinking internal scrubbing component will not be overturned or askance, due to turbulence of the stream, which will interfere with the restoring of the normal working condition.

The preferred embodiment 1 differs from the embodiment 2 in that, in embodiment 1 shown in FIG. 1, the front cover 11 of the said internal scrubbing component 10 further includes a concave plane 111, the said concave plane 111 being at the lowest part underneath the geometrically horizontal central axes of the front cover. The said internal scrubbing component 10 further includes the flange 16 configured around all the circular periphery of the rear cover 12 of the said internal scrubbing component 10. The said structure is plainly illustrated as shown in FIG. 1-3, FIG. 1-4 and FIG. 1-5. The aquarium bottom is usually covered with a layer of sand. When applied in this kind of aquarium, the internal scrubbing component 10 will sink alongside the internal surface of the aquarium wall to the sand bed covering the aquarium bottom once the internal scrubbing component 10 breaks away from the external component's magnetic attraction. In this case, the said concave plane 111 will prevent sand grains from being caught between the internal scrubbing component's scrubbing material 14 and the internal surface of the aquarium wall-glass, so as to avoid the scrape over the internal surface of the observation glass caused by the sand grain being forced on the surface when the components being restored to work. Since the magnetic attraction exerted between the said hand-hold scrubbing component 20 and the internal scrubbing component 10 is very mighty, the design of flange 16 can serve as a handle over the internal scrubbing component to facilitate the use, therefore, the fingers are freed from being jammed when the said hand-hold scrubbing component and the internal scrubbing component unite with each other. Furthermore, the design of the flange 16 is also convenient for removing of the said internal scrubbing component from the observation glass.

Figures 2, 3, 4:
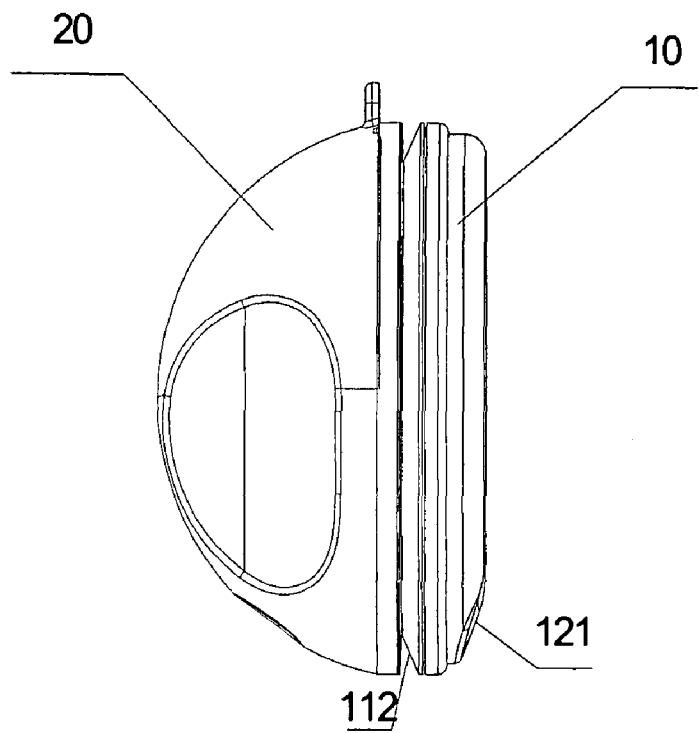
Figure 3:
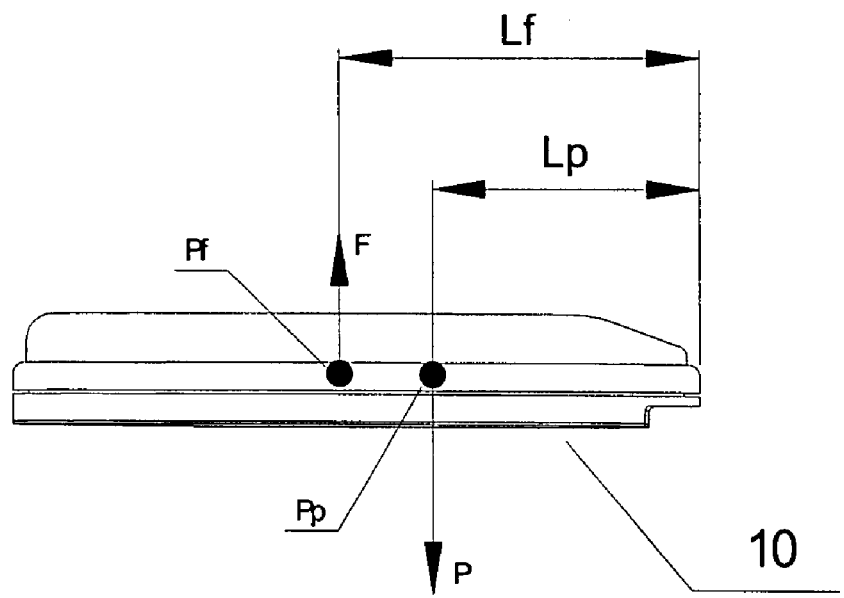
Figure 4:
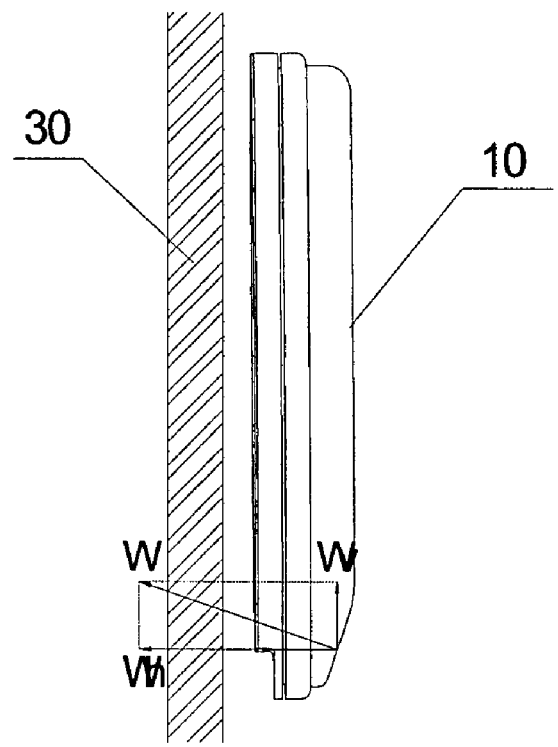

In the embodiment 2 as shown in FIG. 2, the concave surface 111 and flange 16 are absent from the structure of the said internal scrubbing component. Instead, the circular periphery around the front cover of the said internal scrubbing component 10 is designed as an inclined plane for transition. The said structure is plainly illustrated as shown in FIG. 2-2, FIG. 2-3 and FIG. 2-4. The against-wall-glass scrubbing components applying this design can effectively prevent the said situation as that the sand grain scraping over the inner wall-glass surface or the user's figures being trapped by the components. The implementation effect of the said inclined plane 112 distributed at the lowest part underneath the geometrically horizontal central axes of front cover 11 of the said internal scrubbing component 10 equals that of the concave surface employed in the said embodiment 1, and the implementation effect of the said circular periphery part of said inclined plane 112 equals that of the said concave 16 employed in the embodiment 1.

The invention claimed is:

1. A design method of an against-wall-glass sinking magnetic scrubber assembly based on using the magnetic scrubber assembly for cleaning the wall-glass of an aquarium, comprising an internal scrubbing component and an hand-hold scrubbing component; comprising the steps of:
   A. providing a set of magnets and magneto-conductive plate that are installed in the said internal scrubbing component, providing another set of magnets and a magneto-conductive plate that are installed in said hand-hold scrubbing component, and whereby the internal scrubbing component on the inner surface of the wall-glass can move with movement of the hand-hold scrubbing component on the outer surface of the wall-glass of the aquarium;
   B. providing a scrubbing material which is covered on surfaces of the front cover of said internal scrubbing component and of a base shell of said hand-hold scrubbing component;
   C. arranging a total specific gravity of the internal scrubbing component to be greater than that of liquid contained in the aquarium;
   D. arranging a center of gravity of the internal scrubbing component to be underneath a geometrically horizontal central axes of the internal scrubbing component;
   E. wherein a product of a length Lp from a center of gravity Pp of internal scrubbing component to a lowest point and gravity P of the internal scrubbing component is smaller than a product of a length Lf from an equivalent function point Pf of buoyancy F that the internal scrubbing component is exerted to its lowest part and the buoyancy F that the internal scrubbing component is exerted, such that the internal scrubbing component erects automatically after it is lied down.

2. The design method of an against-wall-glass sinking magnetic scrubber assembly according to claim 1, wherein the front and rear covers of said internal scrubbing component are made of material whose specific gravity is lower than that of water, or, a hermetic cavity is configured between the front and the rear covers of the said internal scrubbing component.

3. The design method of an against-wall-glass sinking magnetic scrubber assembly according to claim 1, wherein the lowest part below the geometrically horizontal central axes of the rear cover of the internal scrubbing component is shaped as an inclined plane.

4. The design method of an against-wall-glass sinking magnetic scrubber assembly according to claim 1, wherein the function lines of gravity P and buoyancy F are arranged such that the internal scrubbing component is received are in the same line when the internal scrubbing component is in an upright position.

5. The design method of an against-wall-glass sinking magnetic scrubber assembly according to claim 4, wherein a counterweight block is mounted underneath the geometrically horizontal central axes of the rear cover of the internal scrubbing component.

6. The design method of an against-wall-glass sinking magnetic scrubber assembly according to claim 1, wherein the lowest part underneath the central axes of the front cover of the internal scrubbing component is to be configured as concave plane.

7. The design method of an against-wall-glass sinking magnetic scrubber assembly according to claim 1, wherein a circular periphery of the said internal scrubbing component is configured as a flange or an inclined plane.

8. An against-wall-glass sinking magnetic scrubber assembly for cleaning wall-glass of an aquarium, comprising an internal scrubbing component or cleaning inner surface of the said wall-glass and a hand-hold scrubbing component which slides on outer surface of the said wall-glass; the said internal scrubbing component comprises a front cover, a rear cover, a magnet group and a scrubbing material; the said hand-hold scrubbing component comprises a base shell, a handle, a magnet group and a scrubbing material; the hand-hold scrubbing component slides on the outer surface of the wall-glass of the aquarium and synchronously draws the internal scrubbing component to move on the inner surface of the same wall-glass; the said internal scrubbing component further comprises a hermetic cavity between the front cover and the rear cover; and the said magnet groups comprise at least a permanent magnet respectively and a sheet of magneto-conductive plate respectively, wherein the magnet group is installed within the said hermetic cavity without jamming up;
   a counterweight block is mounted underneath the geometrically horizontal central axes of the rear cover of the internal scrubbing component;
   the rear cover comprises an inclined plane positioned at the lowest part below the geometrically horizontal central axes of the rear cover.

9. The against-wall-glass sinking magnetic scrubber assembly according to claim 8, characterized in that: The said front cover further comprises a concave plane positioned at the lowest part below the geometrically horizontal central axes of the front cover.

10. The against-wall-glass sinking magnetic scrubber assembly according to claim 8, characterized in that: a flange is configured around all the circular periphery of the rear cover or an inclined plane of the said internal scrubbing component.

* * * * *